Nov. 15, 1949     J. A. ROZSA ET AL     2,487,897

EMERGENCY KEY CASE

Filed May 9, 1946     2 Sheets-Sheet 1

INVENTORS
JOHN A. ROZSA &
BY LOUIS F. KNAB

THEIR ATTORNEY

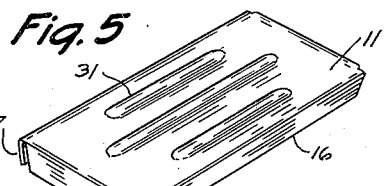
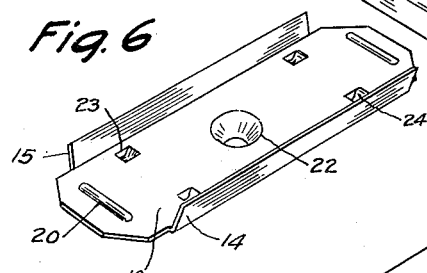
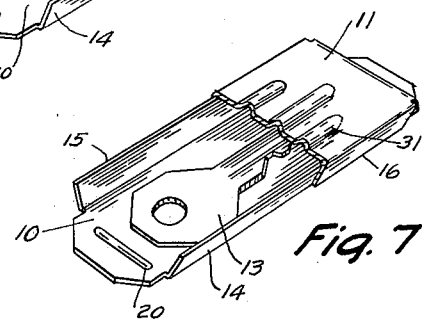
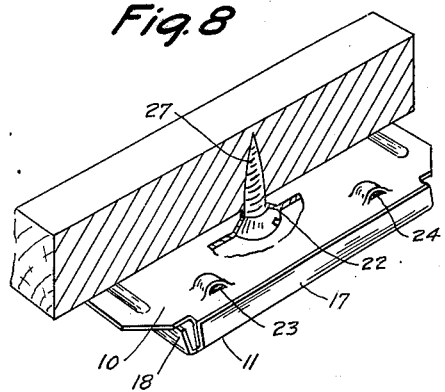
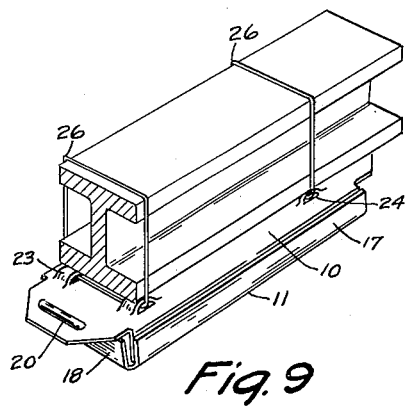

Patented Nov. 15, 1949

2,487,897

UNITED STATES PATENT OFFICE 2,487,897

EMERGENCY KEY CASE

John A. Rozsa and Louis F. Knab, Philadelphia, Pa., assignors, by direct and mesne assignments, to Guild Design & Manufacturing Company, Philadelphia, Pa., a copartnership consisting of John A. Rozsa and Louis F. Knab Application May 9, 1946, Serial No. 668,571

3 Claims. (Cl. 224—29)

This invention relates to keys for motor vehicles, aircraft, boats, and the like, and in particular, a case by which a key may be secured at a hidden point and only used in an emergency, such as when the usual key is locked inside of the vehicle, misplaced, or lost.

The invention contemplates providing an extra key and placing this key in a receptacle that may be attached to a part of a vehicle or the like, and which will normally remain in place.

To further insure the owner against the possibility of burglary or theft of the car, it is contemplated that each owner will locate the key receptacle at a different point, such as under the hood or fender, or on a member of the chassis or pipe, or rod or other support. To accomplish this end, the case of this invention includes an opening by which the base of the case may be screwed directly to a beam or surface, a clamp by which the base may be mounted upon a rod or tube, and eyelets by which it may be held by wires to a beam of the chassis or other structural element.

The purpose of this invention is, therefore, to provide a case adapted to hold a key, and means for attaching the case to any convenient hidden part of a vehicle or the like; wherein the key or case will not be readily located, and wherein it is accessible in case of an emergency.

In the preferred form, the invention includes a case having a base with a screw or bolt opening and a cap or closure adapted to snap on the base to hold a key and, at the same time, conceal the bolt, screw, or other attaching means.

The object of the invention is, therefore, to provide a case with a closure in the form of a cap that may be slid or snapped on the base, in which the base is provided with mounting means, and the closure prevents access to the mounting means when in the closed position.

Another object of the invention is to provide a device for hiding a key at an obscure or remote point of a motor vehicle, airship, boat, or the like, which may readily be attached or mounted by the average layman.

Another object is to provide means for hiding a key in a motor vehicle, airship, boat, or the like, in which the key is freely held so that it may readily be removed.

Another object is to provide a device for hiding a key in a vehicle or the like in which the key may be removed and replaced without removing the base of the device from the vehicle or the like.

A further object is to provide a relatively small case for enclosing a key, in which the case may readily be mounted on a motor vehicle wherein the case is provided with a closure that snaps into place so that it will not work off by the constant jarring of the vehicle.

With these and other objects in view, the invention embodies a key case having a base with an opening for a screw or the like, projecting eyelets providing attaching means, projections for holding a cap, and outwardly extending flanges, and a cap having inwardly extending flanges adapted for positioning on the flanges of the base with end flanges adapted to snap over the projections of the base to lock the cap in the position of closing the case.

For a full and more complete understanding of the invention, reference may be had to the following description and accompanying drawings wherein:

Figure 4 illustrates the case attached by a clamp to a pipe or tube of a vehicle or the like.

Figure 5 is a view showing the cap separated from the base.

Figure 6 is a similar view showing the base with the cap omitted.

Figure 7 is a view showing the device in the inverted position with part of the cap broken away showing a key therein.

Figure 8 illustrates a case attached to a beam or other flat member in which the case may be held by a screw.

Figure 9 illustrates the device attached to the underside of a beam or other structural element, as shown in Figure 3.

Figure 1:
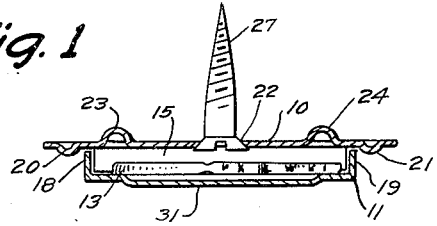
Figure 1 is a view showing a longitudinal section through the case.

Referring now to the drawings wherein like reference characters denote corresponding parts, the case of this invention is formed with a base 10 and a cap 11, the base and cap being of sufficient size to hold a key, as indicated by the numeral 13.

The base 10 is formed of a flat piece of material with outwardly extending side flanges 14 and 15, and the cap 11 is provided with corresponding flanges 16 and 17 which are adapted to slide over the flanges 14 and 15.

The cap 11 is also provided with end flanges 18 and 19 which snap over projections or beads 20 and 21 adjacent the ends of the base to hold the cap in position on the base. In the design shown, the beads 20 and 21 are formed from indentations in the opposite side of the base, although it will be understood that they may be formed in any manner.

The base 10 is provided with a central opening 22 and ears forming eyelets 23 and 24 through which the base may be attached to a beam 25 or other part of the frame or chassis of a vehicle or the like. Wires or bands 26 may be inserted through the eyelets to secure the base to a beam or the like, as shown in Figure 3.

The base 10 may be directly attached by a screw or bolt 27 to the under surface of a running board or to a part of one of the fenders, or to the cowl, and although the attaching element is illustrated as a wood screw, a machine screw, bolt, or attaching element of any other form may be used. With the base held by a screw, the eyelets 23 and 24 extending upward above the countersunk portion of the central screw opening 22 engage the surface to which the base is attached and provide tensioning means preventing rattle, and, at the same time, locking the screw or bolt, preventing the screw or bolt working loose.

Figure 4:
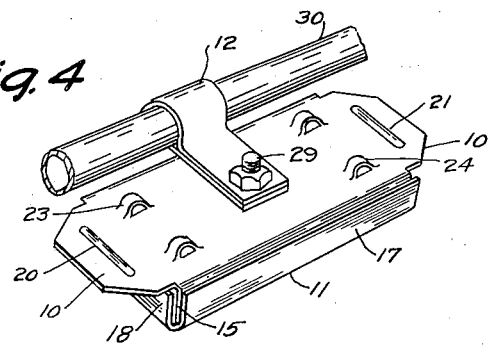

In the design shown in Figure 4, a bolt 29 secures the base to the clamp 12 which may be placed around a pipe or tube 30, or around a rod, or other part of the vehicle.

Figure 2:
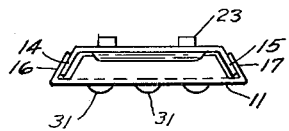
Figure 2 is an end view of the case.
Figure 3:
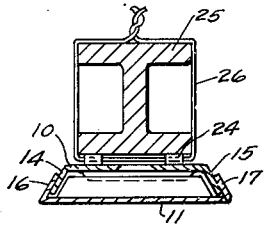
Figure 3 is a cross section through the case.

The outer surface of the cap 11 may be flat, as shown in Figure 3, or may be provided with reinforced corrugations 31, as shown in Figures 1 and 2.

The design and construction of the case will be readily understood from the foregoing description. In use, the base may first be located and attached to a surface or part of a motor vehicle, airship, boat, or the like, and when this is secured in place, a key may be placed in the cap, and the flanges of the cap slid over the flanges of the base until the end flanges of the cap snap over the projections or beads of the base, which will secure the cap in place.

The device will normally remain in place, and the key will remain therein; however, in an emergency, such as when a key is lost, misplaced, or locked in the vehicle, the cap may be removed, the key used, and then the key and cap may be replaced.

While a preferred specific embodiment of the invention is hereinbefore set forth, it is to be clearly understood that the invention is not to be limited to the exact construction illustrated and described because various modifications of the details may be provided in putting the invention into practice within the purview of the appended claims.

What is claimed is:

1. A key case having a flat base adapted to be secured to a part of a motor vehicle or the like, and a closure slidable on said base, said base having outwardly and angularly extending flanges integrally connected to the outer edges thereof and the side walls of said closure consisting of inwardly and angularly extending flanges adapted to slide over said base flanges, and end portions on said closure forming a substantially completely enclosed case.

2. A key case having a base of flat sheet material adapted to be secured to a part of a motor vehicle or the like, and a closure slidable on said base, said base having outwardly and angularly extending flanges integrally joined to the outer side edges thereof and the side walls of said closure consisting of inwardly and angularly extending flanges adapted to slide over said base flanges, end portions on said closure forming a substantially completely enclosed case, and a plurality of eyelets on said base for attaching it to said vehicle.

3. A key case having a base of flat sheet material adapted to be secured to a part of a motor vehicle or the like, and a closure slidable on said base, said base having outwardly and angularly extending flanges and the side walls of said closure consisting of inwardly and angularly extending flanges adapted to slide over said base flanges, end portions on said closure forming a substantially completely enclosed case, and beaded portions on said base adapted to lock said closure in closed position.

JOHN A. ROZSA.
LOUIS F. KNAB.

REFERENCES CITED

The following references are of record in the file of this patent:

UNITED STATES PATENTS

| Number | Name | Date |
| --- | --- | --- |
| 977,445 | Fugate | Dec. 6, 1910 |
| 1,537,287 | Bates | May 12, 1925 |
| 1,836,669 | Koch | Dec. 15, 1931 |
| 2,295,747 | Mills | Sept. 15, 1942 |

FOREIGN PATENTS

| Number | Country | Date |
| --- | --- | --- |
| 6,054 | Sweden | Oct. 12, 1894 |
| 456,176 | Great Britain | Nov. 4, 1936 |
| 457,854 | Great Britain | Dec. 4, 1936 |